United States Patent

[11] 3,572,458

| [72] | Inventor | Hans Tax |
| | | Potsdamer Str. 3, 8 Munich 23, Germany |
| [21] | Appl. No. | 782,671 |
| [22] | Filed | Dec. 10, 1968 |
| [45] | Patented | Mar. 30, 1971 |

[54] ALL-WHEEL STEERING SYSTEM
11 Claims, 13 Drawing Figs.

[52] U.S. Cl. .................................................. 180/79.1, 280/91
[51] Int. Cl. .................................................. B62d 5/04
[50] Field of Search .................................. 180/79.1, 45, 46; 280/91

[56] References Cited
UNITED STATES PATENTS

| 3,203,500 | 8/1965 | Gaberson et al. | 180/79.1 |
| 3,244,250 | 4/1966 | Barrett | 180/79.1 |
| 3,236,324 | 2/1966 | Levratto | 180/46 |
| 3,280,931 | 10/1966 | Cahill et al. | 180/79.1 |
| 3,306,390 | 2/1967 | Jamme | 280/91X |
| 3,387,684 | 6/1968 | Belke et al. | 180/79.1X |

Primary Examiner—Kenneth H. Betts
Assistant Examiner—John A. Pekar
Attorney—Low and Berman ABSTRACT: A system for individually steering all wheels of a heavy vehicle in which the wheel supports are individually turned by servomotors. The operating signals of respective cam controlled servo transmitters and signals from position indicators are combined to produce error signals which are fed to the servomotors. The cams allow for the different turning angle required for each wheel and may be replaced by other cams shaped for parallel turning of all wheels. If the track width of the vehicle is variable, the individual cams are replaced by cam drums which are shifted axially in response to changes in track width and are shaped to compensate for the required changes in the turning angle with the track width.

Patented March 30, 1971

INVENTOR
Hans Tax
By: Lawrence Benson
AGENT

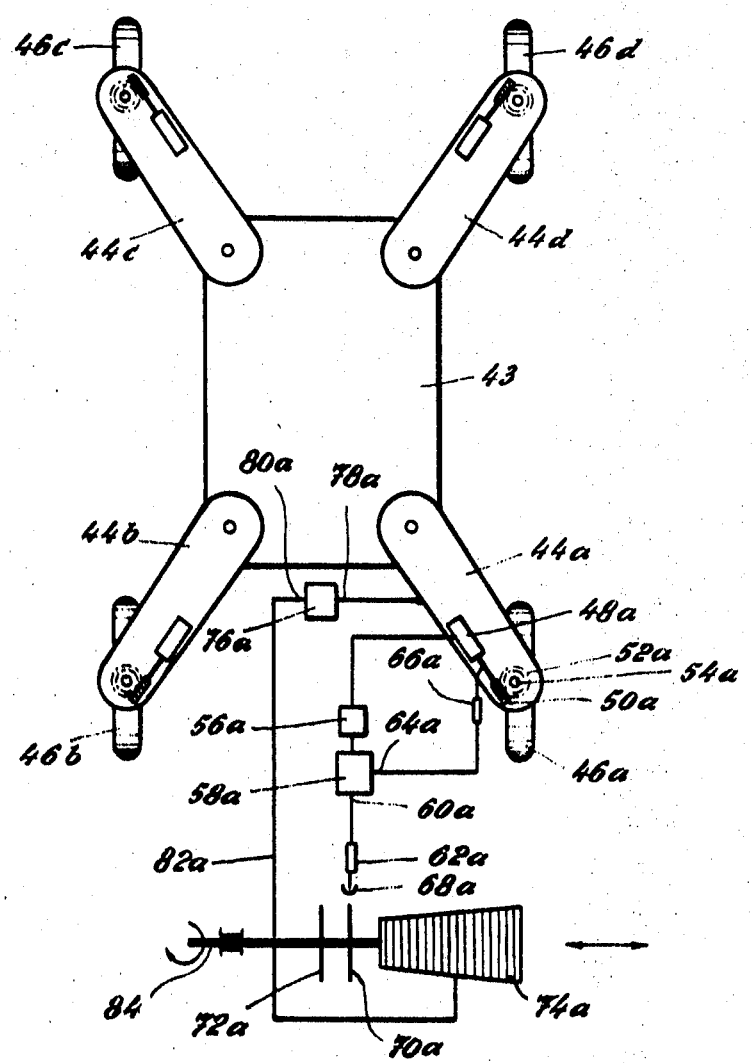

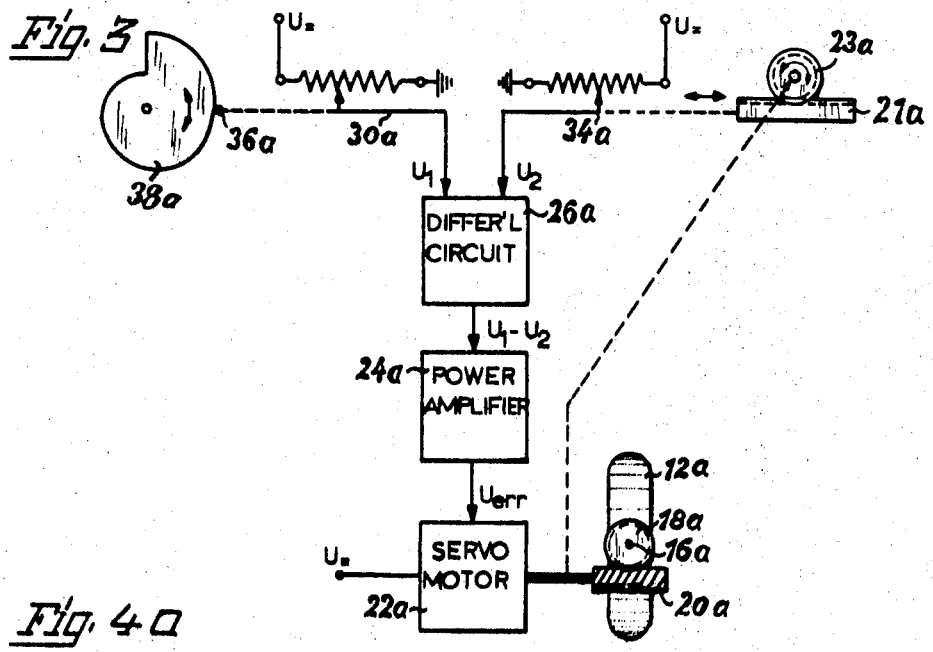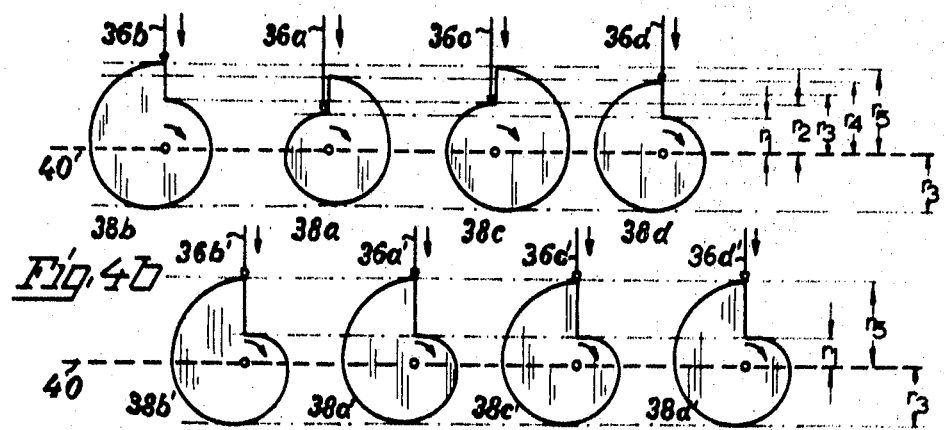

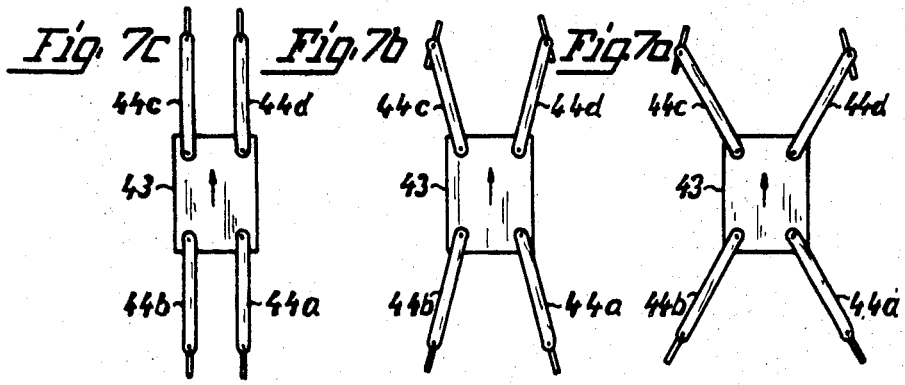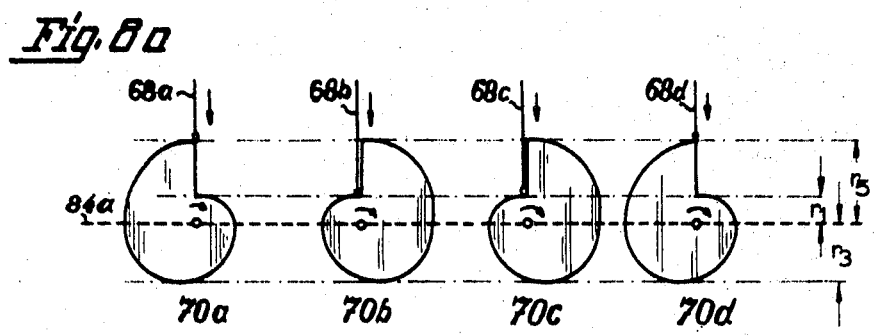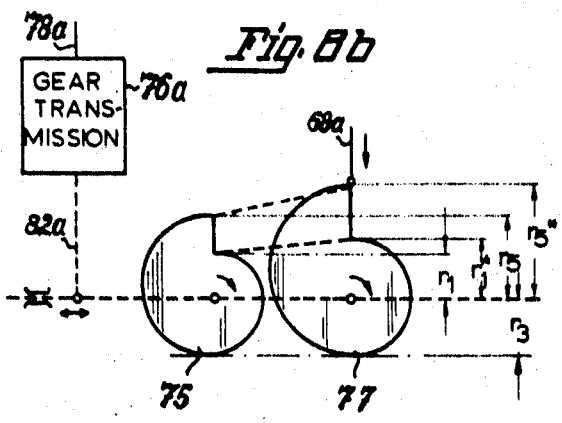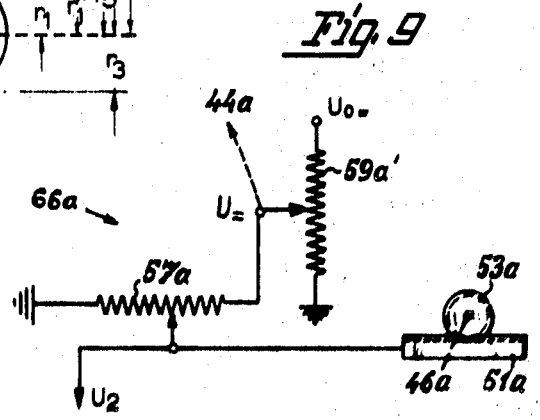

3,572,458

ALL-WHEEL STEERING SYSTEM

BACKGROUND OF THE INVENTION

This invention relates to vehicles having a plurality of individually steered wheels, and particularly to an all-wheel steering system.

It is known to equip heavy and bulky vehicles, such as traveling construction cranes, with steering systems which permit wheels at the four corners of the crane platform to be turned simultaneously. Such an all-wheel steering system permits the crane to make tight turns not otherwise available with the relatively long wheelbase and wide track required for stability.

The known systems rely on mechanical steering linkages between a central steering device and the several wheel-supporting axle assemblies. Because of the heavy load carried by each axle assembly, the linkages must be heavy and contribute materially to the weight and cost of the vehicle. They must be rather complex if the wheels are to run in curves having a common center of curvature as is desirable for reducing the wear on the vehicle tires and on the road traveled. If it is desired to move a conventional construction crane transversely to its normal direction of travel, as during transfer from the roadbed of a street to a narrow construction site, an auxiliary vehicle must be provided or the crane wheels must be set individually by hand.

It is an object of the invention to provide a steering system for individually steering the several wheels of a heavy vehicle which is light in weight, occupies relatively little space, yet is extremely versatile so as to permit the vehicle to perform complex movements without external auxiliary devices.

SUMMARY OF THE INVENTION

According to a basic aspect of this invention, the angular positions of the wheel supports or axle assemblies relative to their normally vertically extending turning axes are changed by individual servomotor mechanisms which are interposed between the vehicle body and each wheel support. An individual servo transmitter is connected to each servomotor mechanism for transmitting to the motor mechanism an operating signal representative of a desired angular position of the associated wheel support. The several transmitters are simultaneously actuated by a joint actuating mechanism.

Each servomotor mechanism may include a position indicator whose indicating signal is representative of the actual angular position of the corresponding wheel support and is compared in a comparator with the operating signal. The resulting error signal of the comparator, which represents the difference between the actual and desired angular positions of the wheel support is fed to a motor which turns the wheel support in a direction to reduce the magnitude of the error signal, as is usual in electrical, hydraulic or other feedback circuits. A more detailed discussion of control loops of the type employed by this invention may be found, for example, in "Control of Nuclear Reactors and Power Plants" by M. A. Schultz (McGraw Hill Book Co., Inc., New York, 1955) and in the papers and books cited therein.

When the actuating mechanism includes a manually operated control member and responds to movement of the control member by an operator for actuating the transmitters, the wheel supports are turned simultaneously through respective angles in response to a predetermined movement of the control member. These angles may be different during normal travel around curves, or equal as for rectilinear movement of the vehicle transversely to its normal direction of movement.

Cam drives for actuating the several servo transmitters may be readily shifted between the two conditions, and cam drums may permit modification of the turning angles by suitably shaped surfaces which are shifted axially relative to cam followers on the servo transmitters. Such a modification is desirable if the track width of the vehicle can be changed, and the axial shifting movement of the cam drums may be controlled in response to the changes in track width.

The exact nature of this invention as well as other objects and advantages thereof will be readily apparent from consideration of the following specification relating to the annexed drawing.

BRIEF DESCRIPTION OF THE DRAWING

In the drawing:

FIG. 2 shows a modified crane carriage in a view corresponding to that of FIG. 1;

FIG. 3 is a block diagram of the steering mechanism for one of the wheels on the carriage of FIG. 1;

FIG. 4a shows one set of cams in the steering system of FIG. 1 in a conventional manner;

FIG. 4b similarly illustrates another set of cams in the system of FIG. 1;

FIG. 5 shows the position of the wheels on the carriage of FIG. 1 during crane travel through a curve;

FIG. 6 illustrates the position of the wheels on the same carriage during rectilinear crane movement at an oblique angle to the normal direction of travel;

FIG. 7a, 7b and 7c illustrate sequential positions of the wheels and of wheel-carrying extension arms on the body of the crane carriage of FIG. 2 during transition from the normal working position of the body to its traveling position;

FIG. 8a shows a set of cams in the carriage of FIG. 2 in a view corresponding to those of FIGS. 4a and 4b;

FIG. 8b similarly shows a cam drum in the apparatus of FIG. 2; and

FIG. 9 is a schematic of a position indicator for use in the embodiment of the invention illustrated in FIG. 2.

DESCRIPTION OF THE PREFERRED EMBODIMENTS

Figure 1:
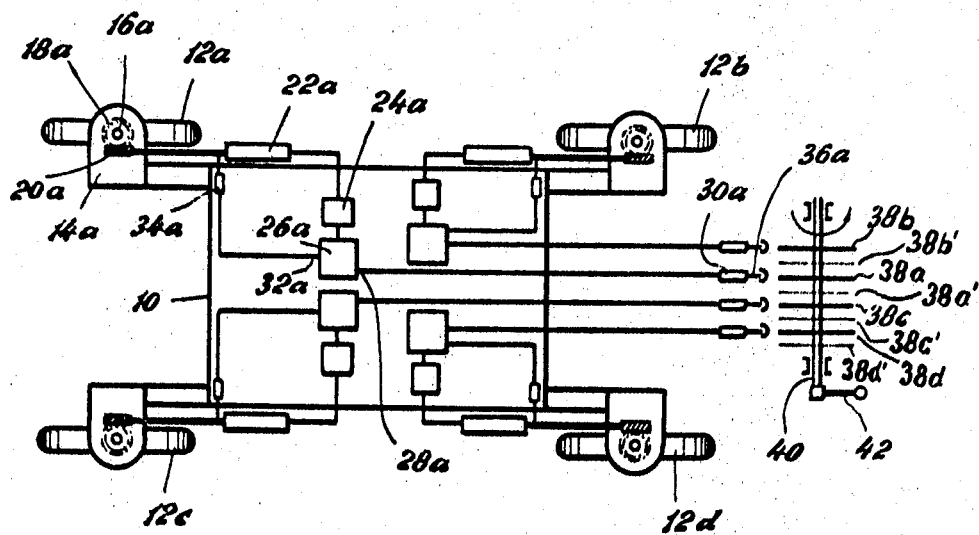
FIG. 1 shows the carriage of a traveling crane equipped with a steering system of the invention in fragmentary and partly diagrammatic plan view.

Referring now to the drawings and initially to FIG. 1, there is shown only as much of an otherwise conventional vehicular construction crane as is necessary for an understanding of this invention. The entire superstructure of the crane, its engine, and the power train which connects the engine to the hoisting apparatus have been omitted together with other elements not directly relevant to this invention.

The body 10 of the crane carriage is provided with four individually steered wheels 12a, 12b, 12c, 12d. The steering mechanisms of the four wheels are identical except for cams described below, and the following description of devices associated with the wheel 12a will be understood to be equally applicable to the three other wheels. A bearing 14a on the carriage body 10 receives the vertical shaft 16a of a wheel-supporting axle assembly, not otherwise shown, on which the wheel 12a is rotatably mounted.

The shaft 16a is equipped with a worm gear 18a meshingly engaging a worm 20a on the output shaft of an electric servomotor 22a. The motor is energized in part by the output of a power amplifier 24a to turn its output shaft clockwise or counterclockwise depending on the polarity of the amplifier output, and at a speed commensurate with the magnitude of the amplifier output.

The amplifier 24a is fed an error signal from a comparator 26a which has a conventional differential circuit. One input 28a of the comparator 26a is conductively connected to a servo transmitter 30a to receive from the same an electric operating or reference signal representative of the desired angular position of the wheel support 16a. The actual position of the wheel support 16a is sensed and indicated by a position indicator 34a whose indicating signal is fed to the second input 32a of the comparator 26a.

The servo transmitter 30a is set for the desired wheel support position by means of a cam follower 36a which cooperates with a radial cam 38a in the illustrated position of the apparatus. The cam 38a, and the corresponding cams 38b, 38c, 38d associated with the wheels 12b, 12c, 12d are fixedly mounted in axially spaced relationship on a common camshaft 40.

The shaft 40 is journaled in the nonillustrated crane superstructure in the operator's cab and can be operated by the operator by means of a control bar 42 radially extending from the shaft 40. The shaft 40 can also be shifted axially by means of the bar 42 so as to engage the several cam followers with a set of radial cams 38a', 38b', 38c', 38d' and to disengage them from the cams of the first-described set.

The steering system for the wheel 12a is shown in more detail in FIG. 3. The servosystem briefly described above is energized by a direct current source U=such as a lead of a storage battery whose other terminal is grounded. The effective cam face of the cam 38a is a spiral, and the cam follower 36a moves radially toward or away from the axis of the cam and of the shaft 40 when the latter is turned by means of the control bar 42. Nonillustrated stops limit the bar 42 to slightly less than a full turn so that the cam follower 36a cannot reach the straight radial portion of the cam face which connects the inner and outer ends of the spiral.

The servo transmitter 30a is a potentiometer whose movable contact is attached to the cam follower 36a. The other two terminals of the potentiometer are connected to ground and to the current source U=so that a potential $U_1$, which is a function of the angular position of the shaft 40, is applied as a reference or operating signal to the comparator input from the movable potentiometer contact.

The position indicator 24a includes a pinion 23a mounted on the shaft of the worm 20a and a rack 21a meshingly engaged by the pinion 23a. The rack is attached to the movable contact of a potentiometer 25a conductively connected to the direct current source U=, to ground, and to the other input of the comparator 26a to which it supplies a potential $U_2$. The differential circuit of the comparator thus produces an error signal output which is proportional to the difference $U_1-U_2$ in magnitude and direction. The error signal is further amplified in the power amplifier 24a, and the amplified error signal $U_{err}$ is fed to the field winding of the direct current servomotor 22a. The armature winding of the motor is connected to the current source U=.

The direction and magnitude of the angular displacement of the wheel support 16a is a function of the direction and magnitude of the potential difference $U_1-U_2$, and the motor 22a turns the worm gear 18a in a direction to reduce the difference to zero.

When the crane carriage travels through a curve, its wheels 12a, 12b, 12c, 12d should assume positions such as those shown in FIG. 5 in which their axes of rotation converge in a common point or a common vertical line 0 to hold wear of the vehicle tires and of the roadway to a minimum, and to reduce the required traction force. Because of the track width of the vehicle, the path traveled by the inner wheels has a radius of curvature significantly smaller than the radius of the path traveled by the outer wheels. The positions of the wheels are suitably set in a simple manner by the cams on the shaft 40.

In the view of FIG. 4a, the normally coaxial cams 38a, 38b, 38c, 38d, which control the angular positions of the wheel supports during curvilinear carriage travel are shown juxtaposed in respective axial aspects. The cams 38b, 38c are mirror images of each other, and similar mirror symmetry is found between the cams 38a, 38d. If the cam faces of the two cams 38a, 38c associated with the front wheels are termed left-handed spirals, the faces of the cams 38b, 38d for the rear wheels are right-handed spirals. When the carriage is to be steered into a turn, the front wheels are pivoted in the same direction through different angles, and the rear wheels are similarly turned in the opposite direction.

During a clockwise movement of the cams 38a, 38d from the position seen in FIG. 4a, the cam followers 36a, 36d move toward the axis of cam rotation in the shaft 40, and the cam followers 36b, 36c move away from the axis. When the shaft is turned clockwise 180° from the position of FIG. 4a, the cam followers engage the median portions of the cams, and are all at a distance $r_3$ from the cam axis. In this position of the cam followers, all wheels are parallel to each other, as is shown in FIG. 1, and the crane moves straight forward or backward.

The cam position illustrated in FIG. 4a corresponds to the wheel positions seen in FIG. 5 for the tightest right turn of which the crane is capable. The cam followers 36a, 36b are farther radially from the level $r_3$, at respective levels $r_1$ and $r_5$ at the inner and outer respective ends of the associated cam faces, than the cam followers 36c, 36d associated with the less tilted outer wheels 12c, 12d and located on intermediate levels $r_4$ and $r_2$. Because of the symmetry of the cams, as pointed out above, the followers 36c, 36d are farthest from the median level $r_3$ at the levels $r_5$, $r_1$ respectively in a tight left turn, and the cam followers 36a, 36b are at the intermediate levels $r_4$, $r_2$.

When the shaft 40 is shifted axially by means of the control bar 42 to disengage the cams 38a, 38b, 38c, 38d, and to engage the second set of cams with the cam followers 36a, 36b, 36c, 36d, the wheels may be turned in unison as is shown in FIG. 6 to permit rectilinear movement of the crane carriage transversely to its normal direction of movement. The cams 38a', 38b', 38c', 38d' are shown in FIG. 4b. They are identical, and their cam faces spiral outward from the innermost level $r_1$ in one-half of a turn to the level $r_3$ and thence to the level $r_5$. To shift between curvilinear and transverse rectilinear carriage movement, the wheels must be brought into the straight position of FIG. 1, as will be obvious. The shaft 40 is equipped with nonillustrated releasable stops which normally hold it in either of its two aforedescribed axial position.

The modified crane carriage illustrated in FIG. 2 has a body including a platform 43 and four extension arms 44a, 44b, 44c, 44d pivotally attached to the four corners of the platform 43. The free ends of the arms carry respective wheels 46a, 46b, 46c, 46d, so that the track width between the front wheels 46c, 46d and between the rear wheels 46a, 46b may be changed by pivoting the arms.

The axle assemblies which constitute the supports of the individual wheels are mounted on the arms 44a, 44b, 44c, 44d in the same manner, closely similar to the arrangement described above with reference to FIGS. 1 and 3, so that only the steering mechanism for the wheel 46a will be described, the others being identical except for the configuration of cam faces, as discussed above in connection with FIG. 4a.

A servomotor 48a mounted on the arm 44a drives a worm 50a in meshing engagement with a worm gear 52a on the upright shaft 54a which is the only illustrated element of the support for the wheel 46a. The motor 48a is controlled by the amplified error signal from a power amplifier 56a, the amplifier input being connected to a comparator 58a whose inputs 60a, 64a draw a position indicating signal from a position indicator 66a, described in more detail hereinbelow with reference to FIG. 9, and an operating or reference signal from a servo transmitter 62a. The transmitter 62a is actuated by a cam follower 68a which may cooperate with a radial disc cam 70a, a radial disc cam 72a, or a cam drum 74a on a common control shaft 84. The control bar which permits an operator to turn the shaft 84 through almost 360° and to shift the shaft axially as needed to engage a selected cam element with the cam follower 68a has been omitted from the drawing.

The disc cams 70a, 72a are normally fixedly fastened on the shaft 84a, and the drum 74a is splined to the shaft in a conventional manner, not illustrated, so as to permit the drum to move axially on the shaft, but to prevent its rotary movement relative to the shaft. The input end 78a of a track width indicator 76a is connected with the arm 44a, and its output 80a is connected to the drum 74a by a mechanical linkage 82a in such a manner as to shift the drum axially on the shaft 84 in response to the angular position of the arm 44a on the platform 43. It will be appreciated that the shaft 84 carries additional cam discs and cam drums associated with the wheels 44b, 44c, 44d, but not shown in the drawing, and that separate sets of cams may be provided for forward and backward movement.

When the crane is operated, it is desirable to spread the arms 44a, 44b, 44c, 44d in the manner shown in FIG. 2 so that their longitudinal axes enclose angles of 45° with the platform edges and the crane is most stably supported on its wide base. This base, however, may be too wide for travel of the crane through narrow streets, and the track width of the vehicle must be reduced for this purpose. The cam 70a and the corresponding cams for the other wheels permit the track width to be adjusted in a very simple manner.

If the wheels initially assume the positions shown in FIG. 7a and the crane carriage is moved forward in the direction of the arrow, the arms 44a, 44b, 44c, 44d are swung toward the median longitudinal plane of the carriage by friction between the wheels and the ground on which the wheels roll while supporting the carriage, as is sequentially shown in FIGS. 7a and 7c. Conversely, the initially parallel arms can be swung apart by reversing the angular positions of the wheel supports during forward movement.

In the positions of FIG. 7a, the planes of rotation of the rear wheels 46a, 46b diverge toward the rear while the planes of the front wheels converge in a forward direction as far as possible. As the arms approach each other during the forward movement of the crane carriage, all wheels are gradually aligned with the direction of normal crane movement by the operator while the arms 44a, 44b, 44c, 44d swing into the position of FIG. 7c.

The four cams 70a, 70b, 70c, 70d which bring about these wheel movements spiral each from a minimum radius $r_1$ to an intermediate level $r_3$ at 180°, and ultimately to a maximum radius $r_5$. The faces of the cams 70a, 70d on the right side of the vehicle are right-handed spirals, those of the cams 70b, 70c on the left side of the vehicle are left-handed spirals. The cams are fastened on the common shaft 84 in such a manner that the cam followers 68b, 68c are at the level $r_1$ while the cam followers 68a, 68d are at the level $r_5$.

The cams 72a, 72b, 72c, 72d may be identical with the cams 38a', 38b', 38c', 38d' respectively. They are brought into engagement with the cam followers 68a, 68b, 68c, 68d for rectilinear travel of the crane carriage transversely to its normal direction of movement in the manner more fully described above and not requiring repetition. They cause the axes of rotation of the wheels 46a, 46b, 46c, 46d to remain parallel in the manner illustrated in FIG. 6.

When the crane shown in FIG. 2 moves in a partly curvilinear path while its arms 44a, 44b, 44c, 44d are spread or partly spread as shown in FIGS. 7a, 7b, it is still necessary to turn the wheels in such a manner that their axes intersect a common vertical line. The difference in the radii of curvature of the paths traveled by the inner and outer wheels varies with the track width and the cam drum 74a permits the desired modification in the angular position of the wheel supports.

FIG. 8b shows the two radial end faces 75, 77 of the drum 74a. The spirals which define the cam track about these faces differ in their smallest radii $r_1, r_1^*$ and in their maximum radii $r_5, r_5^*$. Their median radii $r_3$ at 180° from the minimum and maximum radii are the same. When viewed in axial section through the flat face portion which connects the highest and lowest levels of the curved cam face, the drum surface would thus be represented on one side of the axis by a line parallel to the axis at the distance $r_3$, and on the other side of the axis by lines approaching the axis from level $r_5^*$ to $r_5$, and from level $r_1^*$ to $r_1$ respectively. Considered as a whole, the drum tapers from the right toward the left as viewed in FIG. 8.

The position indicator 66a is shown in more detail in FIG. 9. In addition to a rack 51a and pinion 53a connected to the wheel 46a which actuate the movable element of a potentiometer 59a as shown in FIG. 3 with reference to the wheel 12a, pinion 23a, rack 21a and potentiometer 34a, the indicator 66a is provided with a second potentiometer 59a' whose movable element is operated in a nonillustrated manner by a pinion fixed on the carriage 43 and a rack which rotates with the arm 44a about the pinion axis to shift the rack longitudinally on the supporting arm.

The potentiometers 59a and 59a' are mounted on the arm 44a and one fixed terminal of each potentiometer is grounded. The other fixed terminal of the potentiometer 59a' is connected to a battery which provides a constant voltage $U_o$=, and the other fixed terminal of the potentiometer 59a is conductively connected to the movable contact of the potentiometer 59a'. A position or reference signal $U_2$ is furnished by the movable contact of the potentiometer 59a, and is simultaneously indicative of the angular position of the arm 44a on the carriage 43, and of the wheel 46a on the arm 44a, and the windings of resistance wire in the potentiometers 59a, 59a' are arranged to provide a signal $U_2$ which is related to the angular position of the wheel 46a to the carriage 43 in a simple manner. Those skilled in the art will readily select potentiometer windings to suit dimensional relationships of the carriage 43 and the arms 44a, 44b, 44c, 44d to hold the wheels in the paths discussed above under all operating conditions of the apparatus.

The linkage 82a, not shown in detail in the drawing, includes a pivotally mounted fork engaging an annular groove on the cam drum 74a so as not to interfere with angular movement of the drum. The position indicator 76a is a gear transmission whose input member is turned by a rack attached to the arm 44a, and whose output member shifts a rack hingedly connected to the fork so as to swing the fork and thereby to shift the drum toward the right, as viewed in FIG. 8b, when the arm 44a approaches the position of FIG. 7a, and to shift the drum toward the left when the arm 44a approaches the position of FIG. 7c.

The shaft 84 is axially fixed by nonillustrated stops while the cam drum 74a is shifted axially on the shaft by the track width indicator 76a to compensate for the changes in the radius of curvature of the path traveled by the wheel 46a as the track width is varied. At any specific track width, the axial section of the drum 74a engaged by the cam follower 68a operates in the manner of the narrow radial disc 38a described more fully with reference to FIG. 4a, and the nonillustrated cam drum associated with the wheels 46b, 46c, 46d are similarly analogous to the cams 38b, 38c, 38d.

If the practically infinite variability in track widths provided by the cam drum 74a is not needed, the drum may be replaced by two or more individual radial cams for as many different track widths, and these cams may be mounted on the shaft 84 side by side for alternative engagement with the cam followers 68a, etc., as described with reference to the two cam sets on the shaft 40 in FIG. 1. A corresponding result is achieved by releasably mounting one set of cams for curvilinear motion on the shaft 84, and by replacing the cam set by another set as required by a change in track width. Ultimately, the entire control shaft 84 with the cams supported thereon may be replaced by another shaft carrying different cams. It will be appreciated that FIGS. 1 and 2 are not drawn to scale, and that each cam shaft illustrated with all its cams may fit into the palm of one hand, the small bulk of the control units being a particular advantage of this invention.

Electrical servosystems are preferred at this time for transmitting the operator's commands to the individual wheel supports, but the structural elements for analogous hydraulic systems are staple articles of commerce and may be substituted for their electrical or mechanical counterparts in the illustrated apparatus.

It will be appreciated that stopping pins (not shown) are provided for holding the arms 44a, 44b, 44c, 44d in the several angular positions on the body 43 which are shown in FIGS. 7a, 7b, 7c and in such intermediate positions as may be desirable.

I claim:

1. In a steering system for a vehicle having a body, a plurality of supports mounted on said body for angular displacement about respective, normally vertically extending axes, a wheel rotatably mounted on each support, and turning means on said body for individually turning said supports about the axes thereof, the improvement in the turning means which comprises:

a. a plurality of servomotor means interposed between said body and respective supports for changing the angular positions of the associated supports relative to said axes, two of said supports being movable on said body toward and away from each other transversely of the normal direction of movement of said vehicle;

b. a plurality of servo transmitter means connected to said servomotor means for transmitting to the connected servomotor means respective operating a signals representative of desired angular positions of the associated supports;

c. joint actuating means operatively connected to said plurality of servo transmitter means for simultaneously actuating the same and for thereby simultaneously turning said supports through respective turning angles; and d. modifying means for modifying the magnitude of said turning angles in response to the spacing of said two supports.

2. In a system as set forth in claim 1, each of said servomotor means including position indicating means connected to the associated support for producing an indicating signal representative of the actual angular position of said support, comparator means connected to said position indicating means and to the associated servo transmitter means for receiving said indicating signal and said operating signal, and for emitting an error signal representative of a difference between the angular positions respectively represented by said operating and indicating signals, and turning motor means connected to said support and to said comparator means and responsive to said error signal to turn said support in a direction to reduce the magnitude of said error signal.

3. In a system as set forth in claim 1, said actuating means including a movable control member and responding to movement of said control member for actuating said servo transmitter means.

4. In a system as set forth in claim 3, said actuating means including shifting means for varying the relationship of the magnitudes of said turning angles in response to said predetermined movement of said control member.

5. In a system as set forth in claim 3, shifting means for shifting said actuating means between a first condition in which said turning angles are equal, and a second condition in which said turning angles are different.

6. In a system as set forth in claim 1, an electrical circuit operatively interposed between each servomotor and the associated servo transmitter, and constituting the sole connection between said servomotor and said servo transmitter.

7. In a steering system for a vehicle having a body, four extension arms pivoted to said body for movement about respective vertically extending pivot axes, each arm having a terminal portion remote from the associated pivot axis, an axle assembly mounted on each terminal portion for angular movement about a vertically extending turning axis, said axle assemblies moving toward and away from each other between a plurality of relative positions during said movement of said arms, and a wheel mounted on each axle assembly for rotation about a horizontally extending axis of rotation and for rolling engagement with a surface for thereby supporting said vehicle on said surface, and turning means for turning said axle assemblies about the respective turning axes, the improvement which comprises:

a. pivot means securing said arms to said body for free swinging movement about said pivot axes respectively;

b. a turning motor on each extension arm operatively connected to the corresponding axle assembly for turning the latter; and c. single operating means connected to said turning motors for simultaneously operating a plurality of said turning motors in a direction to cause said swinging movement of the arms associated with said plurality of motors when the wheels mounted on the associated axle assemblies are in rolling engagement with said surface, whereby said associated axle assemblies are moved between said relative positions.

8. In a system as set forth in claim 7, said plurality of motors including the turning motor on each of said four arms.

9. In a system as set forth in claim 7, said operating means including generating means for generating a plurality of operating signals, transmitting means for transmitting said operating signals to said plurality of motors respectively and for operating the motors in response to the transmitted signals, and control means for controlling said generating means, said control means including a single movable control member, and means operatively connecting said control member to said generating means for actuating the same in response to the movement of said control member.

10. In a steering system for a vehicle having a body, four extension arms pivoted to said body for movement about respective vertically extending pivot axes, each arm having a terminal portion remote from the associated pivot axis, an axle assembly mounted on each terminal portion for angular movement about a vertically extending turning axis, said axle assemblies moving toward and away from each other between a plurality of relative positions during said movement of said arms, and a wheel mounted on each axle assembly for rotation about a horizontally extending axis of rotation and for rolling engagement with a surface for thereby supporting said vehicle on said surface, and turning means for turning said axle assemblies about the respective turning axes, the improvement which comprises:

a. a turning motor on each extension arm operatively connected to the corresponding axle assembly for turning the latter; and b. operating means connected to said turning motors and responsive to said relative positions of said axle assemblies for operating the motors in a manner that said axes of rotation intersect a common vertical line after said turning in each of said relative positions.

11. In a system as set forth in claim 10, said operating means including sensing means for sensing the relative position of said axle assemblies, generating means for generating a plurality of operating signals, transmitting means for transmitting said operating signals to said motors respectively and for operating said motors in response to the transmitted signals, control means including a single movable control member, means operatively connecting said control member to said generating means for actuating the same in response to the movement of said control member, and modifying means for modifying said operating signals in response to the sensed relative position.